United States Patent
Rowton et al.

[11] 3,714,128
[45] Jan. 30, 1973

[54] POLYUREA COATING BASED ON CYANOALKYLATED POLYOXYALKYLENE POLYAMINES

[75] Inventors: Richard Lee Rowton; Ernest Leon Yeakey, both of Austin, Tex.

[73] Assignee: Jefferson Chemical Company, Inc., Houston, Tex.

[22] Filed: June 25, 1971

[21] Appl. No.: 156,925

Related U.S. Application Data

[63] Continuation-in-part of Ser. No. 852,488, Aug. 22, 1969, abandoned.

[52] U.S. Cl. ............ 260/77.5 CH, 260/77.5 AM
[51] Int. Cl. ...................... C08g 22/02, C08g 22/16
[58] Field of Search ....260/465.5 R, 584 B, 77.5 CH, 260/77.5 C, 75 NH, 77.5 AM, 2.5 AM

[56] References Cited

UNITED STATES PATENTS

| | | | |
|---|---|---|---|
| 3,096,001 | 7/1963 | Boe et al. | 222/135 |
| 3,194,793 | 7/1965 | Kogon | 260/77.5 |
| 3,256,213 | 6/1966 | Gmitter et al. | 260/2.5 |
| 3,281,396 | 10/1966 | Barnes | 260/75 |
| 3,285,879 | 11/1966 | Larson et al. | 260/77.5 |
| 3,440,086 | 4/1969 | Kerns | 117/105.5 |
| 3,236,895 | 2/1966 | Lee et al. | 260/584 |
| 3,654,370 | 4/1970 | Yeakey | 260/584 |
| 3,666,788 | 5/1972 | Rowton | 260/465.5 |

OTHER PUBLICATIONS

Advance Technical Data – "Jeffamine (TM)" Polyoxypropyleneamines. Jefferson Chemical Co., Inc. Houston, Texas (1969) pages 1–10.

*Primary Examiner*—Donald E. Czaja
*Assistant Examiner*—H. S. Cockeram
*Attorney*—John R. Kirk, Jr. et al.

[57] ABSTRACT

Polyureas prepared from an isocyanate and a cyanoalkylated polyoxyalkylene polyamine of the formula

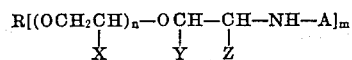

$$R[(OCH_2CH)_n-OCH-CH-NH-A]_m$$
$$\quad\quad\quad\quad X \quad\quad Y \quad Z$$

wherein A is a cyano-lower-alkyl radical or hydrogen provided at least one A is a cyano-lower-alkyl radical are useful as spray coatings. These sprayed polyurea coatings are useful protective coatings which can be used in any field where protective coatings are desirable.

9 Claims, No Drawings

POLYUREA COATING BASED ON CYANOALKYLATED POLYOXYALKYLENE POLYAMINES

CROSS REFERENCE TO RELATED APPLICATION

This application is a continuation-in-part of Ser. No. 852,488 filed Aug. 22, 1969, now abandoned.

Richard L. Rowton's co-pending U.S. Pat. application Ser. No. 852,487, filed Aug. 22, 1969, now U.S. Pat. No. 3,666,788, discloses a method for the synthesis of the cyanoalkylated polyoxyalkylene polyamines useful in the practice of this invention.

BACKGROUND OF THE INVENTION

1. Field of the Invention

The invention pertains to the field of chemistry of protective coatings of polyureas.

2. Description of the Prior Art

It is known that aromatic diamines are used as curing agents for polyurea-polyurethanes. For example, Spencer Kellogg Technical Service Bulletin TS 6893 (Copyright Spencer Kellogg, Division of Textron, Inc., 1968) suggests a coating composition which contains a chlorinated aromatic diamine. Polyoxyalkylene diamines are known to be such rapid curing agents for polyurethanes that they are useless in polyurethane sprays. In the Upjohn Company Technical Bulletin TB-402, p. 9 Aug. 15, 1966), it is reported "Polyoxypropylene diamines cause a rapid viscosity build-up when used in these formulations" in discussing curing agents for spray coatings of polyurethanes.

In spray polyurea and polyurea-polyurethane coatings, a short delay in curing time is necessary. Aliphatic amines in general and polyoxyalkylene polyamines in particular react almost instantaneously with isocyanates; therefore, these amines cannot be used in spray coatings of polyureas utilizing an isocyanate or isocyanate-prepolymer because of the immediate gel or hardening of the polyurea when the amine is added. By using the cyanoalkylated polyoxyalkylene polyamines of our invention, gel times are such that good mixing of the isocyanate and amine can be obtained and the sprayed material has time enough to adhere and level before gelation of the polyurea coating occurs.

SUMMARY OF THE INVENTION

Our invention is polyurea protective coatings prepared by reacting cyanoalkylated polyoxyalkylene polyamines with isocyanates or isocyanate-terminated urethane prepolymers. The invention is particularly applicable to sprayed polyurea coatings. The cyanoalkylated polyoxyalkylene polyamines used in our invention are compounds of the formula

or mixtures thereof where R is the nucleus of an oxyalkylation-susceptible aliphatic polyhydric alcohol containing 2–12 carbon atoms and 2–8 hydroxyl groups, A is hydrogen, or a cyano-lower alkyl radical having one or two carbon atoms between the nitrogen and cyano radical provided at least one A is a cyano-lower-alkyl radical, Z is an alkyl group containing 1–18 carbon atoms, X and Y are hydrogen or Z, $n$ has an average value of 0–50 and $m$ is 2–8. The methyl and ethyl alkyl groups of A may be substituted with lower alkyl groups. Oxyalkylation-susceptible alcohols are alcohols which are added to alkoxides.

DESCRIPTION OF THE PREFERRED EMBODIMENTS

The cyanoalkylated polyoxyalkylene polyamines useful in our invention are prepared from polyoxyalkylene polyamines which are disclosed in Lee's U.S. Pat. No. 3,236,895 (1966) and Yeakey's co-pending U.S. Pat. application Ser. No. 67,970 filed Aug. 28, 1970, now U.S. Pat. No. 3,654,370. Polyoxypropylene diamines having a molecular weight of about 190 to about 2,000 are useful in preparing the cyanoalkylated polyoxypropylene diamines of our invention and polyoxypropylene diamines having a molecular weight of about 190 to about 1,000 are preferred starting materials for the compounds useful in our invention. These polyoxyalkylene diamines have the general formula

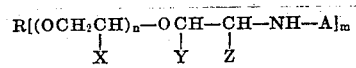

where $y$ is a number from about 2 to about 16. Polyoxypropylene triamines of the formula

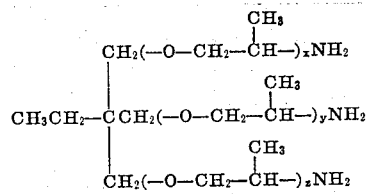

where $x + y + z$ is an average of 5.3 are also useful starting materials for the compounds of our invention.

N-Cyanoalkylated polyoxypropylene diamines and triamines are liquids, thin enough to be sprayed without dilution. Aromatic amines are generally solids which must be dissolved in solvents in order to be useful. Aromatic amines may be conveniently utilized in conjunction with the cyanoalkylated amines of our invention by dissolution in the latter.

The polyurea molecule may contain in addition to urea groups, urethane linkages, ether linkages, ester linkages, etc.

With this invention it is not only possible to use aliphatic isocyanates as reactants, but also the more commonly used aromatic isocyanates, which are much more active than aliphatics. Not only can isocyanate-terminated urethane prepolymers be used (e.g. products made from polyether polyols or polyester polyols and excess isocyanates, such as toluene diisocyanate), but also the isocyanates can in many cases be used alone.

The great variation possible in the amine component of the spray formulation makes possible the use of a wide range of isocyanates. It is possible to use an isocyanate component containing little or no solvent.

Examples I and II, and III, infra, illustrate typical preparations of the compounds useful in our invention.

EXAMPLE I

To a solution of 190 g. (1 mol) of polyoxypropylene diamine of 190 molecular weight and 200 ml. of water was added dropwise with stirring 106 g. (2 mols) of acrylonitrile over a 30-minute period. The mixture exothermed, but the temperature was not allowed to go over 50°C. After standing overnight, volatile material was removed under full vacuum at temperatures up to 100°C. Recovery of the reactants was 100 percent. The product, a nearly colorless and somewhat viscous liquid, had the following analysis in milliequivalents per gram:

| Amine | Meg./g. |
|---|---|
| Primary | 0.19 |
| Secondary | 6.69 |
| Tertiary | 0.02 |
| Total | 6.90 |

Thus, the N,N'-disubstituted product of the formula

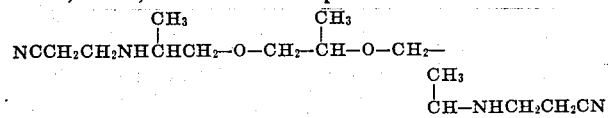

was produced in 97 percent yield. The remaining cyanoethylated compounds useful in our invention are prepared in the same manner, and comparable results are obtained in polyurea coatings using polyoxyalkylene polyamines cyanoethylated with acrylonitrile or methacrylonitrile.

EXAMPLE II

To 400 g. (1 mol) of nitrogen-blanketed polyoxypropylene diamine of 400 molecular weight was added dropwise with stirring 163 g. (2 mols) of 70 percent aqueous glycolonitrile. The mixture exothermed, and the reaction was allowed to proceed at 40° – 50°C. After the nitrile addition was complete, the reaction mixture was allowed to stand for several hours at ambient temperatures. A 100 percent excess of calcium hydroxide was added to neutralize the 0.5 percent phosphoric acid present in the nitrile. After standing a few more hours, water was stripped out at up to 120°C. under full vacuum. Filter aid was added and the mixture filtered. A light brown liquid was obtained. The remaining cyanomethylated compounds useful in our invention are prepared in the same manner and comparable results are obtained using polyoxyalkylene polyamines reacted with glycolonitrile or lactonitrile. The reactions preparing the compounds useful in our invention are selective in that N,N'-disubstitution takes place. If complete substitution of the amine hydrogens occurred, the products would not be satisfactory for use as curing agents for polyureas.

EXAMPLE III

A partially cyanoalkylated polyoxypropylene triamine was prepared according to the following procedure which includes the synthesis of the polyoxypropylene triamine.

The polyoxyalkylene triamine was prepared in a 7-gallon high pressure continuous reactor over a nickel-copper-chromium catalyst at 203°C and 2,500 psig. The feed rates were 74 lb/hr ammonia, 27 lb/hr propylene oxide adduct of trimethylolpropane of 400 molecular weight and 95 standard cubic feet per hour dissociated ammonia. The product was recovered by ammonia stripping the reactor effluent to 60°C and then vacuum stripping to remove water at 25 mm Hg, absolute pressure, to a final temperature of 140°C. The product analysis was as follows:

| | Meg./g |
|---|---|
| Total Acetylatables | 6.95 |
| Total Amine | 6.60 |
| Primary Amine | 6.26 |

The product was a 440 molecular weight polyoxypropylene triamine.

The partially cyanoethylated polyoxypropylene triamine was prepared by heating a mixture of 804 g. (1.81 mols) polyoxypropylene triamine (synthesis described in preceding paragraph), 212 g. of acrylonitrile (4 mols) and 40 g. of water at 75°C for 2 hours. Water and other lights were stripped at up to 110°C. and down to 2 mm Hg. The product had the following analysis:

| Amine | Meg./g. |
|---|---|
| Primary | 1.16 |
| Secondary | 4.10 |
| Tertiary | 0.10 |

The following tables illustrate our invention in more detail. Gel times are reported in seconds. The following abbreviations are used in the tables:

Amines

| | |
|---|---|
| JEFFAMINE D-x | Polyoxypropylene Diamine of x Molecular Weight |
| JEFFAMINE T-403 | Polyoxypropylene Triamine of 450 Molecular Weight |

Amine Suffixes

| | |
|---|---|
| CE | N-(2-Cyanoethyl) |
| BCE | N,N'-bis(2-Cyanoethyl) |
| TCE | N,N'N''-tris(2-Cyanoethyl) |
| CM | N-(Cyanomethyl) |
| BCM | N,N'-bis(Cyanomethyl) |

Isocyanates

| | |
|---|---|
| TDI | Toluene Diisocyanate, 80:20 Isomer Mixture |
| LMDI | Liquid Diphenylmethane Diisocyanate |
| HMDI | Hydrogenated Diphenylmethane Diisocyanate |
| PAI | Polymeric Aromatic Isocyanate |

Polyols

| | |
|---|---|
| PPG-x | Polypropylene Glycol of x Molecular Weight |

The abbreviations for the component formulations of the polyureas are illustrated as follows: 3:1 LMDI:TDI/PPG–800 (2/1) is a mixture of three isocyanate equivalents of LMDI and one equivalent of a TDI/PPG–800 prepolymer, the latter being made from two equivalents of TDI and one equivalent of PPG-800. Pigments and other modifiers may be included in the formulation of polyureas. In each of the Tables, a theoretical equivalent amount of the amine component was added to the isocyanate component contained in a small cup while the mixture was stirred as rapidly as possible with a paddle-type stirrer. After 10 seconds of stirring, a portion of the mixture was poured onto a pan and spread out with a spatula to form a film. Gel time in the cup was noted and recorded, and the physical nature of the film was recorded. The gel times for the formulations illustrate the utility of the polureas as sprayed coatings. The practical gel times shown in the tables, infra, make it possible to use the polyureas for sprayed coatings. If a solvent was used, it was distributed between the two components so that each component was of low viscosity. Films containing solvent were dried in an oven at 80°C. before evaluation. Those mixtures marked with an asterisk (*) did not gel, but thickened to a fairly stiff consistency in the time noted. Effective amounts of cyanoalkylated polyoxyalkylene polyamines include a 20 percent range above or below the theoretical equivalent amount of amine component to isocyanate component. A stoichiometric balance of reactants is preferred. JEFFAMINE is a registered trademark of Jefferson Chemical Co., Inc., Houston, Texas.

The data in Table I illustrate the practical gel times of polyureas obtained from cyanoethylated polyoxypropylene diamines and triamines reacted with isocyanates.

| Reactants | | Solvent | | Gel |
|---|---|---|---|---|
| Isocyanate components | Amine component | Name | amount, % | time, Sec. |
| TDI | JEFFAMINE D-400 | methyl ethyl ketone | 65 | immediate |
| LMDI | JEFFAMINE D-400 | methyl ethyl ketone | 65 | immediate |
| PAI | JEFFAMINE D-400 | methyl ethyl ketone | 65 | immediate |
| HMDI | JEFFAMINE D-400 | ethoxy ethyl acetate | 50 | <1 |
| HMDI | JEFFAMINE T-403 | ethoxy ethyl acetate | 50 | immediate |
| LMDI/PPG-600 (6/1) | JEFFAMINE D-400 | methyl ethyl ketone | 65 | immediate |

Example IV illustrates a polyurea spray coating using the cyanoethylated 400 molecular weight polyoxypropylene diamine of our invention.

EXAMPLE IV

Component A—a 50:50 weight percent blend of liquid diphenylmethane diisocyanate and hydrogenated liquid diphenylmethane diisocyanate containing 7.3

TABLE I

| Reactants | | Solvent | | Gel | |
|---|---|---|---|---|---|
| Isocyanate components | Amine components | Name | Amount, percent | time, sec. | Nature of film |
| LMDI | BCE/Jeffamine® D-400 | Methyl ethyl ketone | 50 | 15 | Soft and pliable. |
| LMDI | CE/Jeffamine D-400 | do | 65 | 17 | Stiff and strong. |
| PAI | BCE/Jeffamine D-400 | do | 65 | 26 | Fairly stiff and strong. |
| HMDI | do | None | | *60 | Soft and fairly strong. |
| HMDI | CE/Jeffamine D-400 | do | | *30 | Slightly stiff. Fairly resilient. |
| LMDI/PPG-800 (2/1) | BCE/Jeffamine D-400 | Toluene | 50 | 15 | Soft. Strong and elastic. |
| LMDI/PPG-800 (6/1) | CE/Jeffamine D-400 | Methyl ethyl ketone | 65 | 18 | Fairly stiff. Fair strength and resilience. |
| PAI/PPG-600 (15/1) | BCE/Jeffamine D-400 | do | 65 | 12 | Soft and pliable. |
| 1:2 HMDI:LMDI/PPG-800 (6/1) | CE/Jeffamine D-400 | do | 35 | 4 | Slightly stiff. Good strength and elasticity. |
| 1:1 HMDI:LMDI/PPG-1000 (4/1) | do | None | | 15 | Soft and elastic. |
| 1:2 PAI:TDI/PPG-600 (2/1) | BCE/Jeffamine D-230 | Methylene chloride | 35 | 15 | Soft and pliable. |
| 1:1 LMDI:LMDI/PPG-800 (2/1) | do | Toluene | 50 | 12 | Fairly stiff. Fair strength and resilience. |
| 1:1:2 HMDI:PAI:TDI/PPG-600 (2/1) | CE/Jeffamine D-230 | Methylene chloride | 35 | 8 | Do. |
| LMDI/PPG-800 (2/1) | TCE/Jeffamine T-403 | Methyl ethyl ketone | 65 | 7 | Soft and elastic. |
| HMDI/PPG-800 (2/1) | CE/Jeffamine T-403 | Toluene | 50 | (a) | Do. |
| 2:1 HMDI:TDI/PPG-1000 (2/1) | BCE/Jeffamine T-403 | None | | 15 | Fairly stiff. Fair strength and resilience. | a 5-6 minutes.

The data in Table II illustrate the practical gel times obtained with cyanomethylated polyoxypropylene diamines and triamines.

meq. isocyanate per gram—and component B—the monocyanoethylated 400 molecular weight polyoxypropylene diamine containing 4.4 meq./g. of amino

TABLE II

| Reactants | | Solvent | | Gel | |
|---|---|---|---|---|---|
| Isocyanate components | Amine components | Name | Amount percent | time, sec. | Nature of film |
| TDI | BCM/Jeffamine® D-400 | None | | 30 | Soft and elastic. |
| LMDI | BCM/Jeffamine D-400 | do | | *10 | Fairly stiff. Fair strength and resilience. |
| LMDI | CM/Jeffamine D-400 | Methyl ethyl ketone | 65 | (a) | Stiff and strong. |
| PAI | do | do | 65 | (b) | Do. |
| PAI | BCM/Jeffamine D-400 | Methylene chloride | 35 | 20 | Soft and pliable. |
| HMDI | CM/Jeffamine D-400 | None | | *60 | Somewhat stiff. Fair resilience. |
| 8:1 LMDI:TDI/PPG-800 (2/1) | BCM/Jeffamine D-400 | do | | 15 | Soft and pliable. |
| 1:2 PAI:TDI/PPG-600 (2/1) | CM/Jeffamine D-230 | Methylene chloride | 35 | 45 | Soft but strong. | a 3-30 minutes.   b 1½ minutes.

The data in Table III illustrates the impracticality of using polyoxyalkylene polyamines with isocyanates for polyurea coatings because of the extremely short gel times.

TABLE III hydrogen and diluted with 5 percent of its weight of methylene chloride—were pumped through a two-component airless Gusmer spray rig at a component B/component A ratio of 1.67/1. In the spray rig, the two accurately metered streams of reactants were brought together in a small chamber, rapidly mixed, and ejected through a spray nozzle. The spray was applied to a rigid urethane foam substrate, whereon it gelled within a few seconds. The sprayed film thus protects the foam from abrasion and degradation. Using this technique, a sprayed film of any thickness can be applied to a surface. These sprayed polyurea coatings are useful protective coatings which can be used in any field where protective coatings are desirable.

We claim:

1. A polyurea composition obtained by reacting with an organic polyisocyanate or isocyanate-terminated prepolymer a cyanoalkylated polyoxyalkylene polyamine of the formula

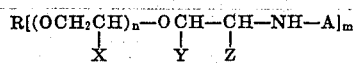

or mixtures thereof wherein R is the nucleus of an oxyalkylation-susceptible aliphatic polyhydric alcohol containing 2–12 carbon atoms and 2–8 hydroxyl groups, A is a cyano-lower-alkyl radical or hydrogen provided at least one A is a cyano-lower-alkyl radical, Z is an alkyl group containing 1–18 carbon atoms, X and Y are hydrogen or Z, $n$ has an average value of 0–50 and $m$ is 2–8.

2. A composition according to claim 1 wherein the cyano-lower-alkyl radical is cyanoethyl.

3. A composition according to claim 2 wherein cyanoalkylated polyoxypropylene diamine is a compound of the formula

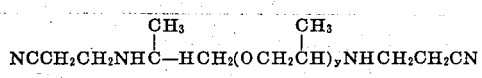

wherein $y$ is a number from about 2 to about 16.

4. A composition according to claim 3 wherein the cyanoalkylated polyoxypropylene diamine is a compound of the formula

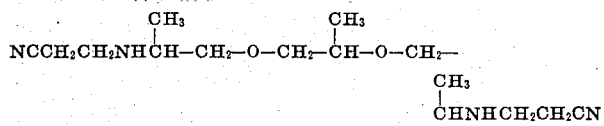

5. A composition according to claim 2 wherein the cyanoalkylated polyoxypropylene triamine is a compound of the formula

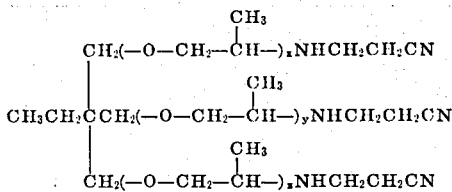

wherein $x + y + z$ is an average of 5.3.

6. A composition according to claim 1 wherein the cyano-lower-alkyl radical is cyanomethyl.

7. A composition according to claim 6 wherein the cyanoalkylated polyoxypropylene diamine is a compound of the formula

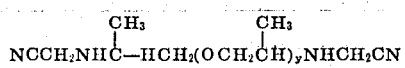

wherein $y$ is a number from about 2 to about 16.

8. A composition according to claim 7 wherein the cyanoalkylated polyoxypropylene diamine is a compound of the formula

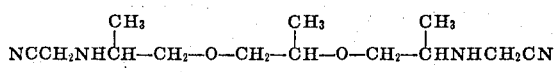

9. A composition according to claim 6 wherein the cyanoalkylated polyoxypropylene triamine is a compound of the formula

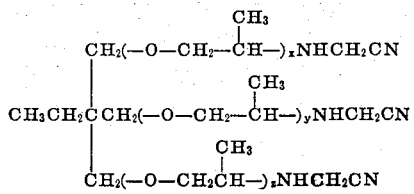

wherein $x + y + z$ is an average of 5.3.

* * * * *